United States Patent [19]
Wright et al.
[11] 3,735,273
[45] May 22, 1973

[54] OFFSET SIGNAL CORRECTION SYSTEM

[76] Inventors: Donald J. Wright, 2411 Northfields Road; Gerald E. Fisher, Sheffield Road, W. Leigh, both of Charlottesville, Va. 22901

[22] Filed: Apr. 6, 1972
[21] Appl. No.: 241,557

[52] U.S. Cl. ....................328/163, 328/162, 328/159, 307/215, 328/48, 328/143
[51] Int. Cl. ....................H03k 5/18
[58] Field of Search....................328/162, 163, 48, 328/143, 159; 307/215

[56] References Cited

UNITED STATES PATENTS

| | | | |
|---|---|---|---|
| 3,310,751 | 3/1967 | Atzenbeck | 328/163 |
| 3,473,131 | 10/1969 | Perkins | 328/163 |
| 3,588,714 | 6/1971 | McIntosh | 328/162 X |
| 3,636,462 | 1/1972 | Baldauf | 328/162 X |

*Primary Examiner*—John S. Heyman
*Attorney*—Elmer R. Helferich et al.

[57] ABSTRACT

A system for correcting offset in analog signal generator output is responsive to simple pulse signal request for correction. A bistable circuit is set upon receiving the correction request and thereupon enables a coincidence circuit to gate pulses to a counter. The counter output is converted by a digital-to-analog converter whose output signal is combined subtractively with the offset signal. Upon nulling of the offset signal the bistable circuit is reset.

6 Claims, 2 Drawing Figures

Patented May 22, 1973 3,735,273

2 Sheets-Sheet 1

Patented May 22, 1973 | 3,735,273

2 Sheets-Sheet 2

OFFSET SIGNAL CORRECTION SYSTEM

FIELD OF THE INVENTION

This invention pertains to offset correction systems and more particularly to a system for correcting offset in the output signal of analog signal generators.

BACKGROUND OF THE INVENTION

Correction of offset in the output signal of analog signal generators is typically performed by manual change of signal generator circuit parameters until the offset is nulled. Simple multi-leg resistive bridge arrangements incorporating a strain gage, a thermister or like sensor may be balanced for relatively long time periods by adjusting a variable resistance in the bridge. In more elaborate signal generators subject to unpredictable drift and like offset, relatively frequent balancing is required. In either instance, repetitive manual manipulation of circuit elements within the signal generator is time consuming, requires skilled technicians and can become impractical, particularly in systems requiring a plurality of signal generators subject to offset.

SUMMARY OF THE INVENTION

It is an object of the present invention to provide a system, responsive to simple operator or ancillary apparatus request, for expeditious correction of offset in the output signal of analog generators.

In attaining this and other objects, the present invention provides circuit means operative external to the analog signal generator on its output signal and effecting a summation thereof with an offset correction signal. The offset correction signal is provided not by time-consuming operator adjustment of circuit elements but by simple request, e.g., pulse input. Responsive to such request, the system provides for the gating of a succession of pulses into a pulse counter and the generation of the offset correction signal in amplitude according with pulse count. The pulse succession is discontinued on offset null and the correction signal then generated is continuously combined in subtractive manner with the analog signal generator output signal.

The objects and features of the invention will be evident from the following detailed description thereof and from the drawings wherein like reference numerals are used to identify like circuit means throughout.

BRIEF DESCRIPTION OF THE DRAWINGS

Referring to FIG. 1, analog signal source 10 provides its output signal over line 12 to summation circuit 14 wherein the source output signal is subtractively combined with an offset correction signal provided on line 16. The offset-corrected source 10 output signal is conducted by line 18 to utilization apparatus.

Figure 1:
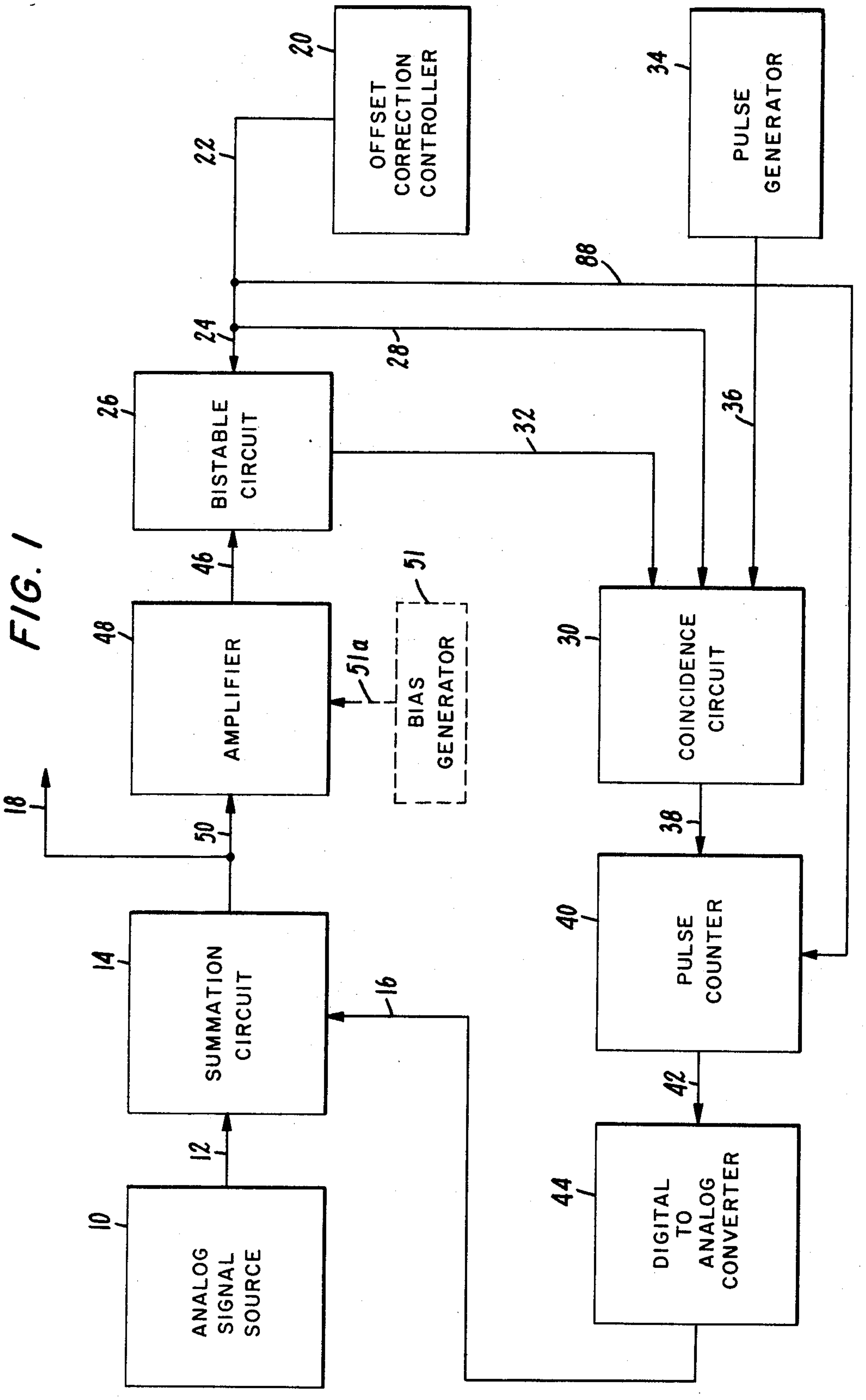
FIG. 1 is a block diagram of the system of the invention.

Offset correction controller 20 is operated whenever it is desired to correct offset in the source 10 output signal and provides an offset correction control pulse or signal. The controller may comprise a simple switch operable manually or otherwise to change the voltage level on line 22. Such controller switch may be mechanically ganged with a switch connected in series circuit with line 18 such that utilization of the source output is interrupted during offset correction and to a switch in signal source 10, such that during offset correction source 10 provides on line 12 only the signal content thereof constituting offset.

The offset correction control signal generated by controller 20 is applied by lines 22 and 24 to bistable circuit 26 and by lines 22 and 28 to coincidence circuit 30. Circuit 26 is set by the line 24 input thereto to provide a first output signal on line 32 to coincidence circuit 30.

During offset correction, the bistable circuit first output signal on line 32 and the control signal on line 28 are of character enabling circuit 30 and accordingly, pulses provided by pulse generator 34 and applied by line 36 to circuit 30 are selectively gated therethrough to line 38 and are counted by pulse counter 40. The digital output signal of the pulse counter provided on line 42 is continually converted by digital-to-analog converter 44 to an analog signal which is applied to line 16. The pulse counter is cleared to zero count by the offset correction control signal through line 88.

Coincidence circuit 30 remains in such enabled condition until bistable circuit 26 is reset by input thereto on line 46, at which time the bistable circuit generates a second output signal on line 32 of character disabling circuit 30. The line 46 signal is provided by amplifier 48 in response to the input signal thereto provided on line 50, namely, the output of summation circuit 14. Circuit parameters of amplifier 48 are selected such that the line 46 reset signal to bistable circuit 26 occurs on zero(ground)-crossover of the line 50 signal or, alternatively, upon equality of the signals on line 50 and output line *51a* of bias generator 51. Bias generator 51, an optional unit shown in broken lines in FIG. 1, may provide a voltage level other than ground for purposes of providing partial correction offset. Thus, a controlled succession of pulses is gated through circuit 30 sufficient to provide the required correction offset signal on line 16. This signal is constantly provided until clearing of counter 40 by the next offset correction control signal applied by line 28 to line 88.

Figure 2:
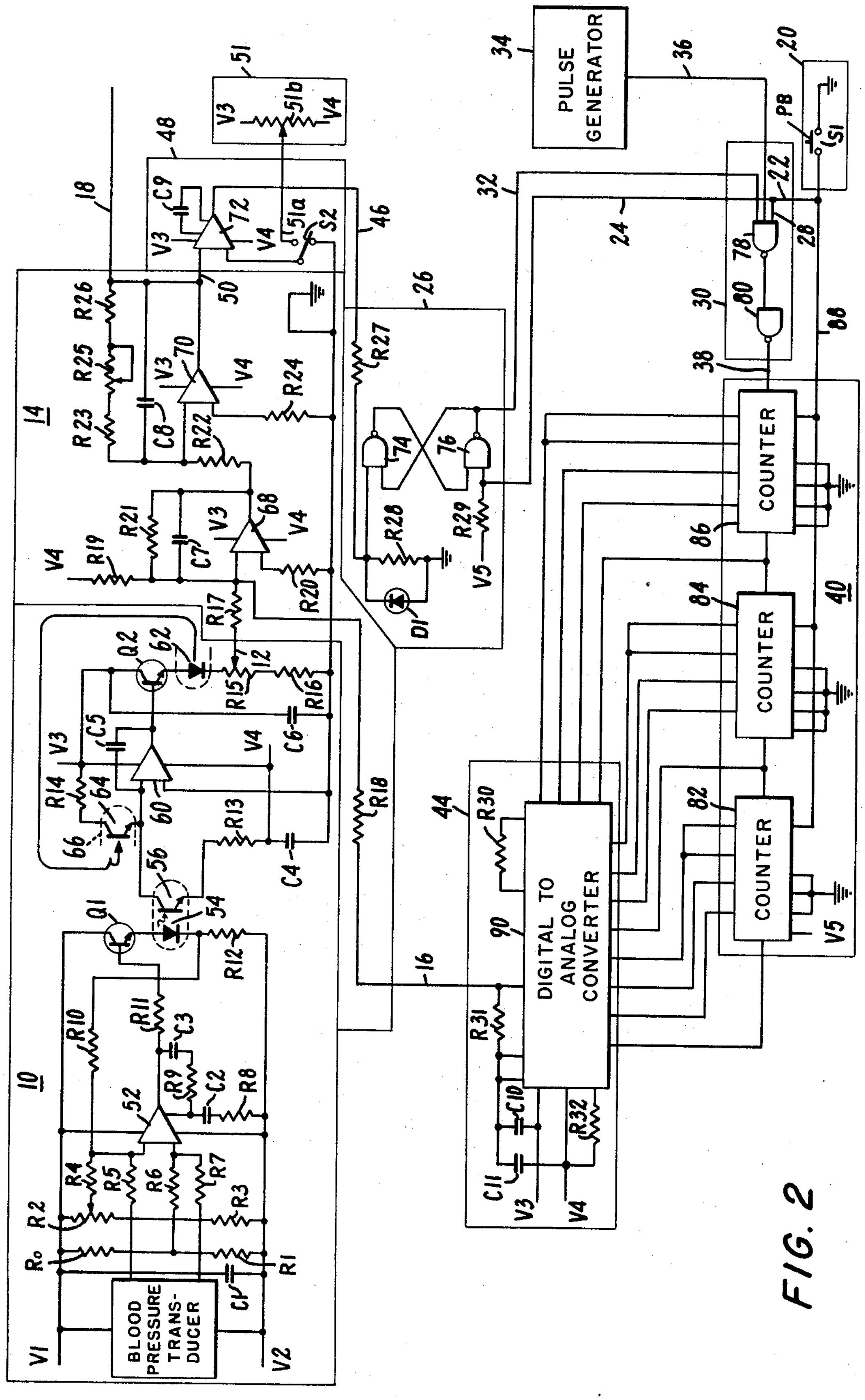
FIG. 2 is a detailed schematic drawing of a system in accordance with the invention.

In the particular arrangement of the system of the invention in FIG. 2, analog signal source 10 is a clinical data source deriving information from a blood pressure transducer, the output signals of which are applied to stage 52 and, following amplification therein, to an emitter-follower stage comprising transistor Q1. This transistor drives a photo-emitting diode 54 whose light pulses are detected by phototransistor 56. By this arrangement, the blood pressure transducer and its associated amplifier may be isolated from the remainder of source 10 and thus may be supplied with operating voltage by a portable voltage supply isolated from electrical ground. Stage 52 may comprise a Fairchild 725C High Gain Operational Amplifier with the following pin connections: pin 2 to the junction of resistors R4 and R5; pin 3 to the junction of R6 and R7; pin 4 to V2; pin 5 to the junction of R9 and capacitor C2; pin 6 to the junction of R11 and C3; and pin 7 to V1.

The output of phototransistor 56 is applied to stage 60 whose output is in turn applied to an emitter-follower stage incorporating Q2. This stage drives photo-emitting diode 62 and provides the source output signal on line 12. Stage 60 may comprise a Fairchild 741C High Performance Operational Amplifier with the following pin connections: pin 4 to the junction of phototransistors 56 and 64, and C5; pin 5 to ground; pin 6 to V4; pin 10 to the junction of C5 and Q2; and pin 11 to V3. To minimize thermal drift in coupling between photo-emitting diode 54 and phototransistor 56, phototransistor 64 is series-connected with phototransistor 56 and is coupled by optics 66 from photo-emitting diode 62.

Summation circuit 14 includes R17 and R18 respectively connected to lines 12 and 16 for summing the source 10 output signal and the offset correction signal. These resistors are connected in common to stage 68 which amplifies the difference signal between the source and offset correction signals, such difference signal being further amplified in stage 70 and provided on output line 50. Stage 68 may comprise a like element to stage 60 above with the following pin connections: pin 4 to the junction of R17, R18, R19, R21, and C7; pin 5 to R20; pin 6 to V4; pin 10 to the junction of R21, R22 and C7; and pin 11 to V3. Stage 70 may also comprise the stage 60 element with the following pin connections: pin 4 to the junction of R22, R23, and C8; pin 5 to R24; pin 6 to V4; pin 10 to line 50; and pin 11 to V3.

Amplifier 48 preferably comprises a nonlinear amplifier stage 72 adapted to swing in output voltage on line 46 from approximately V4 to approximately V3 upon zero-crossover input on line 50 where switch S2 is in the position shown in FIG. 2. Stage 72 may comprise a Fairchild 709C High Performance Operational Amplifier with the following pin connections: pin 4 to line 50; pin 5 to S2; pin 6 to V4; pin 10 to line 46; pins 3 and 12 to C9; and pin 11 to V3. Such output voltage swing may alternatively occur at any given line 50 voltage where S2 connects pin 5 to line 51*a*. As shown, generator 51 comprises a potentiometer 51*b* connected across V3–V4, the potentiometer wiper being connected to line 51*a*.

Bistable circuit 26 includes a pair of NAND gates 74 and 76 which may each comprise one-fourth of a Fairchild 9946 Quadruple 2-Input Gate. In operation of the circuit, the output provided on line 32 is normally LO, thereby disabling NAND gate 78 of coincidence circuit 30. Line 24 is normally maintained HI by connection through R29 to V5, thereby providing the normal line 32 LO. On the occurrence of a first event, wherein line 24 is driven to ground momentarily by depression and release of the normally-open S1 push button PB, the lower input to gate 76 goes LO, thereby providing a HI on line 32 to gate 78. Such line 32 HI is maintained upon return of line 24 to HI since gate 76 and line 46 both apply a HI to gate 74 whose output, then LO, is applied to gate 76. The uppermost and lowermost inputs to gate 78 being HI, the pulses on line 26 are gated through coincidence circuit 30, being twice inverted in gates 78 and 80.

Such pulse gating continues until line 46 swings from HI to LO. On this second event, the upper input to gate 74 becomes LO, the gate 74 output becomes HI and, both inputs to gate 76 being HI, line 32 goes LO. Gate 78 is thereby disabled and a number of pulses corresponding to the amount of offset indicated on line 12 has been applied by line 38 to pulse counter 40.

The first foregoing event, i.e., momentary grounding of line 24 from its normal HI level, accomplished by operation of switch S1 of controller 20, is accompanied by a clearing of the counting stages 82, 84 and 86 of counter 40 by input thereto on line 88. The second foregoing event occurs when the line 18 and ground signals are equal, i.e., when offset correction is effected.

NAND gate 78 may comprise one-third of a Fairchild 9962 Triple 3-Input NAND Gate. NAND gate 80 may comprise Fairchild 9946 Quad 2-Input Gate. Counting stages 82, 84 and 86 may each comprise a Signetics N8281A Binary Counter connected as discussed below to a 12-bit binary digital-to-analog converter unit 90, which may comprise an Analog Devices MDA-12LB 12-bit digital-to-analog converter. The following pin connections are provided for lowest order counting stage 86: pin 13 to line 88; pins 2, 9, 5 and 12 respectively to pins 23, 24, 25 and 21 of unit 90, pin 6 to pin 5, pin 12 also to pin 8 of stage 84; pins 3, 4, 10 and 11 to ground; and pin 8 to line 38. For next order counting stage 84, the following pin connections are provided: pin 13 to line 88; pins 2, 9, 5 and 12 respectively to pins 15, 16, 18 and 14 of unit 90, pin 6 to pin 5, pin 12 also to pin 8 of stage 82; and pins 3, 4, 10 and 11 to ground. The following pin connections are provided for highest order counting stage 82: pin 13 to line 88; pins 2, 9, 5 and 12 connected respectively to pins 9, 11, 13 and 7 of unit 90, pin 6 to pin 5; pins 3, 4 and 10 to ground; and pin 11 to V5.

The following other pin connections are made for unit 90: R30 to pins 22 and 27; R31 to pins 26 and 28; C10 to pins 2 and 5, pin 2 also to V3; and R32 to pins 1 and 17, pin 5 also connected to pin 28, pin 1 also connected to V4. The system voltages are as follows: V1 is +5 volts; V2 is −5 volts; V3 is +15 volts; V4 is −15 volts; and V5 is +5 volts.

Counting stages 82–86 and converter unit 90 are selected to have capacity sufficient to compensate the maximum anticipated offset. The invention contemplates the time-sharing of circuit elements of FIG. 2 among plural sources requiring offset correction. Circuit element values are indicated in Table I below.

TABLE I

| | | | |
|---|---|---|---|
| R0 | 1 KΩ | C1 | 2.2 μf |
| R1 | 1 KΩ | C2 | 100 pf |
| R2 | 10 KΩ | C3 | 470 pf |
| R3 | 10 KΩ | C4 | 4.7 μf |
| R4 | 499 KΩ | C5 | 0.01μf |
| R5 | 10 KΩ | C6 | 4.7 μf |
| R6 | 1 MΩ | C7 | 1500 pf |
| R7 | 10 KΩ | C8 | 680 pf |
| R8 | 510 Ω | C9 | 8 pf |
| R9 | 510 Ω | C10 | 0.1 μf |
| R10 | 1 MΩ | C11 | 0.1 μf |
| R11 | 200 Ω | | |
| R12 | 301 Ω | D1,D2 | IN270 |
| R13 | 510 Ω | | |
| R14 | 510 Ω | | |
| R15 | 100 Ω | | |
| R16 | 49.9 Ω | | |
| R17 | 20 KΩ | | |
| R18 | 10 KΩ | | |
| R19 | 200 KΩ | | |
| R20 | 4.99KΩ | | |
| R21 | 20 KΩ | | |
| R22 | 10 KΩ | | |
| R23 | 20 KΩ | | |
| R24 | 4.99KΩ | | |
| R25 | 20 KΩ | | |
| R26 | 20 KΩ | | |
| R27 | 1 KΩ | | |
| R28 | 1 KΩ | | |
| R29 | 22 KΩ | | |
| R30 | 390 Ω | | |
| R31 | 499 Ω | | |
| R32 | 240 Ω | | |

The value for R32 is selected. The indicated value is nominal.

Various changes in the particularly illustrated arrangement and embodiment of the system of the invention will be evident to those skilled in the art. The particular disclosure herein is thus intended in an illustrative and not in a limiting sense. The true spirit and scope of the invention is defined in the following claims.

What is claimed is:

1. A system for correcting offset signal output of an analog signal generator, comprising:

a. signal summation circuit means having a first input terminal receiving signals generated by said signal generator, a second input terminal and an output terminal;

b. an offset correction controller operable to provide an offset correction control signal;

c. bistable circuit means providing a first output signal on occurrence of said control signal and alternately providing a second output signal on occurrence of a signal of predetermined character at said summation circuit means output terminal;

d. a pulse generator;

e. coincidence circuit means enabled to conduct therethrough successive pulses generated by said pulse generator on coincident occurrence of said bistable circuit means first output signal and said control signal and disabled on occurrence of said bistable circuit means second output signal;

f. a pulse counter providing a digital output signal indicative of the number of said successive pulses conducted through said coincidence circuit means; and g. converter circuit means generating a signal indicative of said counter digital output signal and applying said signal to said summation circuit means second input terminal.

2. The system claimed in claim 1 wherein said signal of predetermined character at said summation circuit means output terminal is a zero voltage crossover signal, said bistable circuit means including a nonlinear amplifier circuit providing a first and alternate second output signals respectively on non-occurrence and occurrence of said zero voltage crossover signal.

3. The system claimed in claim 2 wherein said bistable circuit means further includes a multivibrator circuit responsive to said control signal and to said nonlinear amplifier second output signal in generating said bistable circuit means first and second output signals.

4. The system claimed in claim 3 wherein said multivibrator circuit comprises first and second NAND gates, said first gate being operatively responsive to said nonlinear amplifier and to said second gate, said second gate being operatively responsive to said first gate and to said control signal, said second gate generating said bistable circuit means first and second output signals.

5. The system claimed in claim 1 wherein said summation circuit means includes an amplifier circuit, first and second input resistors connected to the input of said amplifier circuit and separately connected respectively to said summation circuit means first and second input terminals.

6. The system claimed in claim 1 wherein said analog signal generator comprises a clinical data signal generator.

* * * * *